(12) United States Patent
Symrniotis et al.

(10) Patent No.: US 7,332,143 B2
(45) Date of Patent: Feb. 19, 2008

(54) TARGETED DUCT INJECTION FOR $SO_3$ CONTROL

(75) Inventors: Christopher R. Symrniotis, St. Charles, IL (US); William H. Sun, Lisle, IL (US)

(73) Assignee: Fuel Tech, Inc., Batavia, IL (US)

( * ) Notice: Subject to any disclaimer, the term of this patent is extended or adjusted under 35 U.S.C. 154(b) by 97 days.

(21) Appl. No.: 11/275,944

(22) Filed: Feb. 6, 2006

(65) Prior Publication Data

US 2006/0177366 A1    Aug. 10, 2006

Related U.S. Application Data

(60) Provisional application No. 60/650,054, filed on Feb. 4, 2005.

(51) Int. Cl.
*B01D 53/50* (2006.01)
*B01D 53/56* (2006.01)

(52) U.S. Cl. .............. 423/239.1; 423/243.01; 423/243.08; 423/244.01; 423/244.07

(58) Field of Classification Search ............ 423/239.1, 423/243.01, 243.08, 244.01, 244.07
See application file for complete search history.

(56) References Cited

U.S. PATENT DOCUMENTS

| | | | | |
|---|---|---|---|---|
| 3,669,617 A | * | 6/1972 | Lowicki et al. | ........ 423/244.06 |
| 4,038,368 A | * | 7/1977 | Atsukawa et al. | .......... 423/235 |
| 4,193,971 A | * | 3/1980 | Kawamata et al. | ....... 423/243.1 |
| 4,245,573 A | * | 1/1981 | Dixit et al. | .................. 110/343 |
| 4,792,440 A | * | 12/1988 | Nielsen et al. | ......... 423/244.07 |
| 4,848,995 A | * | 7/1989 | Samish | ......................... 62/633 |
| 5,039,499 A | * | 8/1991 | Stowe, Jr. | ................ 423/243.1 |
| 6,997,119 B2 | * | 2/2006 | Radway | ...................... 110/343 |

OTHER PUBLICATIONS

Arthur L. Kohl et al. "Gas Purification" (5th Ed.) (1997) Gulf Publishing Company, P. O. Box 2608, Hosuton, Texas 77252-2608, ISBN 0-88415-220-0, pp. 904-909.*

* cited by examiner

*Primary Examiner*—Timothy C. Vanoy
(74) *Attorney, Agent, or Firm*—Thaddius J. Carvis

(57) ABSTRACT

$NO_x$ and $SO_3$ emissions from combustion of a sulfur containing carbonaceous fuel are reduced simultaneously. The combustion gases comprising $NO_x$ and $SO_2$ are mixed with a $NO_x$ control agent into the combustion gases at a point upstream of a selective catalytic reduction catalyst for reduction of $NO_x$. Following an SCR catalyst or other equipment that can oxidize $SO_2$ to $SO_3$ and prior to contact with an air heater for heating incoming combustion air, magnesium hydroxide is introduced in amounts and with droplet sizes and concentrations effective to form nano-sized particles in the effluent and reduce $SO_3$ caused by the oxidation of $SO_2$ in the catalyst. Computational fluid dynamics is employed to determine flow rates and select reagent introduction rates, reagent introduction location(s), reagent concentration, reagent droplet size and/or reagent momentum.

7 Claims, 1 Drawing Sheet

TARGETED DUCT INJECTION FOR $SO_3$ CONTROL

PRIORITY CLAIM

This application is related to and claims priority to prior U.S. Provisional Patent Application 60/650,054, filed Feb. 5, 2005, the disclosure of which is incorporated herein in its entirety.

BACKGROUND OF THE INVENTION

The invention relates to a process that eliminates constraints on proven $NO_x$ and $SO_3$ reduction technology, by providing a specialized treatment with efficiently controlled reagent introduction for maintaining economy while addressing serious emissions control problems.

Combustion of carbonaceous fuels almost invariably results in pollution. Regulation of the quality of the emissions from combustion sources is essential for maintaining the quality of the air we require for survival. The technology for treating emissions and for reducing the generation of harmful gases has been greatly advanced towards meeting the often opposed objectives of clean air and reasonable costs. Unfortunately, some technological solutions have been shown to be competitive with each other. In these cases, implementation of them at the same time is often too expensive or technically complicated, with the result that old plants or ones with insufficient space availability are shut down or derated. Economic operation of power plants and incinerators is in the public interest, and new technologies are essential to this effort.

The selection of fuels like natural gas can reduce some pollution problems, but it cannot eliminate them. Nitrogen oxides ($NO_x$) are invariably formed with combustion and are often treated by selective non catalytic reactions (SNCR) or selective catalytic reactions (SCR). Burning other fuels, like No. 6 oil, will create $NO_x$ and can cause other problems for boiler operators—including high temperature slagging/fouling and related eutectic corrosion, cold end corrosion/fouling and opacity issues related to carbon particulate and acid mist. In the combustion zone, sulfur in the oil (e.g., 1-5%) auto-catalyzes to sulfur trioxide ($SO_3$), which can condense as sulfuric acid on the back end surfaces (where the temperature has typically been reduced to less than about 150° C.) and promote corrosion and acid plume. In addition, $SO_3$ can be result from oxidation by SCR catalysts.

For $SO_3$ control, injection of alkali material such a magnesium hydroxide is useful; but it typically results in accumulation of solids along the wall and floor due to inadequacies in material properties, equipment design, and injection process. Solids accumulation may lead to an outage of a combustor or a process. Solids accumulation also leads to inefficient use of the reagent. Even with an $SO_3$ control reagent in the fuel or injected into the combustion gases, $SO_3$ remains; and the effluent reaching the cold end can cause problems due its acid pH and the presence of too much $SO_3$. The low pH can adversely affect fly ash disposal and cold end corrosion.

$SO_3$ vapor readily converts to gaseous sulfuric acid when combined with water vapor in the flue gas. As gas and surface temperatures cool through the system the $SO_3$, vapors form a fine aerosol mist of sulfuric acid. The acid aerosol contains sub-micron particles of acid, which can evade separation or capture in gas cleaning devices and exit the stack. Even relatively low $SO_3$ concentrations exiting the stack cause significant light scattering and can easily create a visible plume and high opacity reading. As a general rule, every 1 part per million by volume of $SO_3$ will contribute from 1 to 3% opacity. Thus, exhaust gas concentrations of only 10 to 20 ppm $SO_3$ can cause opacity and acid plume problems. In addition, deposition or formation of acid on any metal surfaces below the acid dew point causes corrosion within the unit, such as at the air heater, duct work and stack liners.

The presence of an SCR unit can further exacerbate the $SO_3$ problem by oxidizing $SO_2$ to $SO_3$. It is not uncommon for the $SO_3$ levels to double (or more) across the SCR catalyst. In a typical SCR $NO_x$ reduction system, the effluent containing $NO_x$ is passed over a suitable catalyst which reduces the $NO_x$ to nitrogen ($N_2$) and water ($H_2O$) by a reagent comprising ammonia ($NH_3$), urea [$(NH_2)CO(NH_2)$], or the like. The catalyst effective to reduce the $NO_x$ in the presence of these reagents, also strongly promotes the oxidation of $SO_2$ to $SO_3$. In some cases, $SO_2$ can also be oxidized to $SO_3$ by other equipment. There is a clear need to reduce $NO_x$, but the $SO_3$ burden created by an SCR or other oxidizing unit must also be controlled.

SCR units are large and costly. To be effective, they must operate at relatively low temperatures and often fill all available space between the combustor and an air heater which uses residual heating capacity of the effluent to heat incoming combustion air. Because of the typical low temperature operation and the presence of significant $SO_3$ concentrations following an SCR unit, it is sometimes necessary to heat the effluent to avoid corrosion, plume, opacity and related problems. Heating in this manner is a further source of inefficiency, and it would be beneficial if there were a way to avoid it.

Historically, $SO_3$ has been reduced by introducing an $SO_3$ treatment agent like magnesium hydroxide at appropriate positions in the duct work. Not all alkaline treatment agents will be useful because $SO_3$ also reacts with water vapor and ammonia used for the SCR reaction to form ammonium sulfate and ammonium bisulfate. Both of these ammonia salts can cause fouling and corrosion problems in the system. Ammonium bisulfate has a melting point under 300° F. and ammonium sulfate at just over 450° F., making both molten or tacky at typical SCR and air heater operating temperatures and making it possible for them to coat, foul and corrode the air heater. Lime cannot be practically used to eliminate the $SO_3$ because it reacts to form gypsum, which can also create fouling problems. Gypsum forms a hard, non-friable deposit with very low solubility that is difficult to remove. Magnesium hydroxide can be better from this standpoint, but has not been introduced with effectiveness downstream of the catalyst, due to particle size and distribution problems.

There is a need for an improved process that could improve the compatibility of SCR treatments for sulfur containing fuels and more effectively deal with back end $SO_3$ corrosion.

DISCLOSURE OF INVENTION

It is an object of the invention to provide an improved technology for SCR $NO_x$ reduction in combustors utilizing fuels tending toward the production of $SO_3$.

It is another object of the invention to improve emission control by reducing the $SO_3$ generated during SCR $NO_x$ reduction.

It is another object to improve process efficiency by reducing $SO_3$ in the back end to permit operation of an air preheater without concern for $SO_3$ condensation and/or bisulfate production.

It is another object to improve process efficiency by reducing $SO_3$ in the back end of a combustor where $SO_3$ is a problem by utilizing an air heater to actually enhance $SO_3$ reduction.

It is another object to improve $SO_3$ reduction chemical utilization within a small reaction space located between an SCR $NO_x$ reduction unit and an air preheater.

A yet further but more specific object is to effectively make use of reagents of nano-sized particles of $SO_3$ reagent and CFD to maximize $SO_3$ reduction while minimizing chemical consumption.

It is a more specific object of the invention to achieve the above objects while at the same time improving efficiency of reagent utilization and combustor efficiency.

These and other objects are achieved by the present invention which provides an improved process for reducing $SO_3$ following an SCR $NO_x$ reducing unit utilizing ammonia or like chemical.

In one aspect, the invention provides a process for reducing $NO_x$ and $SO_3$ emissions from combustion of a sulfur containing carbonaceous fuel in the combustion zone of a combustor, comprising: combusting a sulfur containing carbonaceous fuel with an overall excess of oxygen to form combustion gases comprising $NO_x$ and $SO_2$; introducing a nitrogen containing $NO_x$ control agent into the combustion gases at a point upstream of a selective catalytic reduction catalyst for reduction of $NO_x$; and following the catalyst and prior to contact with an air heater for heating incoming combustion air, introducing magnesium hydroxide in amounts and with droplet sizes and concentrations effective to form nano-sized particles in the effluent and reduce $SO_3$ caused by the oxidation of $SO_2$ in the catalyst.

In another aspect, the invention provides a process for reducing $SO_3$ emissions from combustion of a sulfur containing carbonaceous fuel in the combustion zone of a combustor, comprising: combusting a sulfur containing carbonaceous fuel with an overall excess of oxygen to form combustion gases comprising $SO_2$; moving the resulting combustion gases though heat exchange equipment under conditions which cause the oxidation of $SO_2$ to $SO_3$; and prior to contact with an air heater for heating incoming combustion air, introducing magnesium hydroxide in amounts and with droplet sizes and concentrations effective to form nano-sized particles in the effluent and reduce $SO_3$ caused by the oxidation of $SO_2$.

In one preferred aspect, computational fluid dynamics is employed to determine flow rates and select reagent introduction rates, reagent introduction location(s), reagent concentration, reagent droplet size and/or reagent momentum.

Other preferred aspects and their advantages are set out in the description which follows.

BRIEF DESCRIPTION OF THE DRAWINGS

The invention will be better understood and its advantages will become more apparent when the following detailed description is read in conjunction with the accompanying drawings, in which.

DETAILED DESCRIPTION OF THE INVENTION

Figure 1:
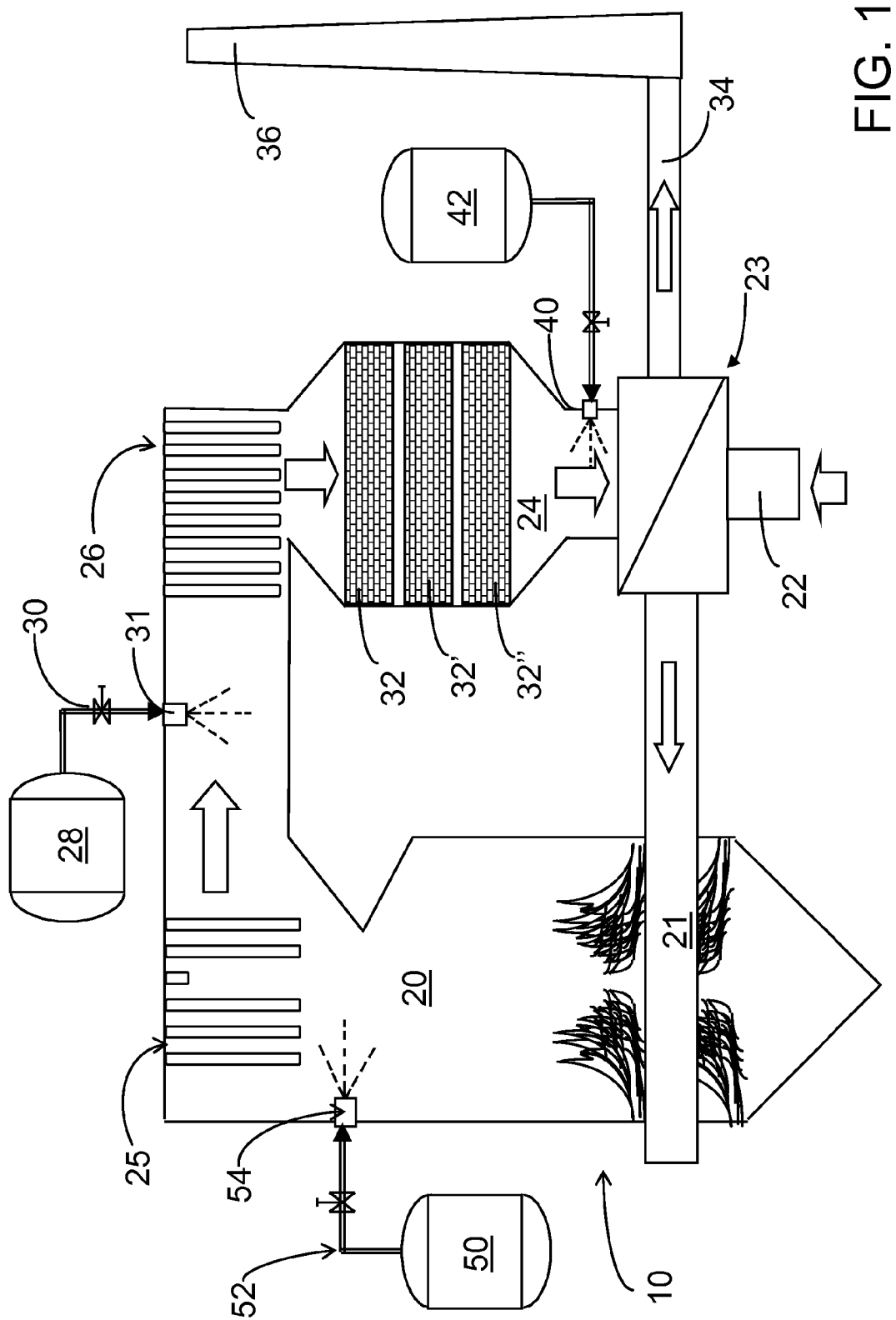
FIG. 1 is a schematic view of one embodiment of the invention.

Reference will first be made to FIG. 1, which is a schematic view of one embodiment of the invention. FIG. 1 shows a large combuster 10 of the type used for producing steam for electrical power generation, process steam, heating or incineration. Fuel (from a source not shown) is burned with air in a combustion zone 20. The fuel can be any combustible material, including gas, oil, coal, organic waste or any other combustible material suitable for the combuster. The process of the invention has particular advantage with fuels, such as petroleum based products containing sulfur, e.g., in amounts of 500 ppm or more, and 1% to 5% in particular. Among these are residual, typically heavy fuels, e.g., residual fuels like No. 4, 5 and 6 oils. These oils are characterized by high viscosities, being just barely pourable or unpourable at 70° F., contain significant sulfur and high levels of condensed aromatics and tend to be difficult to combust fully and cleanly. The air, supplied by duct 21, is preferably brought in via duct 22 and preheated by a gas-to-gas heat exchanger 23 which transfers heat from duct 24 at the exit end of the combuster. Hot combustion gases rise and flow past heat exchangers 25, which transfer heat from the combustion gases to water for the generation of steam. Other heat exchangers, including economizer 26 may also be provided according to the design of the particular boiler. The combustion gases will contain $NO_x$, which is generated by the heat of combustion alone or due to the presence of nitrogen-containing compounds in the fuel. They will also contain $SO_x$, principally as $SO_2$.

For the embodiment of FIG. 1, a suitable nitrogenous $NO_x$ reduction agent such as ammonia or aqueous urea is introduced from a suitable source 28 through line with valve 30. The urea can be introduced at a temperature suitable for SNCR with residual ammonia or other gaseous $NO_x$ reducing species passing through the duct to SCR catalyst units 32, 32' and 32". Techniques have been developed, inter alia, for SCR using ammonia with a variety of catalysts (e.g., Kato et al. in U.S. Pat. No. 4,138,469 and Henke in U.S. Pat. No. 4,393,031), hybrids of SCR and SNCR (e.g., Hofmann, et al., U.S. Pat. No. 5,139,754), and multi-level SNCR injection (e.g., Epperly, et al., U.S. Pat. No. 4,777,024) utilizing urea, a hydrolysate of urea or ammonia, or a related chemical such as any of those described by any of these, which are all incorporated by reference in their entireties.

Among the catalysts suitable for the $NO_x$ reduction are those advertised for this purpose by the manufacturers. Among the useful SCR catalysts are those described in the representative reference processes herein. Selective catalytic reduction processes for reducing $NO_x$ are well known and utilize a variety of catalytic agents. For instance, in European Patent Application EP 210,392, Eichholtz and Weiler discuss the catalytic removal of nitrogen oxides using activated charcoal or activated coke, with the addition of ammonia, as a catalyst. Kato et al. in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, or oxides thereof with the addition of ammonia to achieve the desired catalytic reduction. In some cases one catalyst section could be an oxidation catalyst. The $NO_x$ reducing catalysts are effective to reduces the $NO_x$ to nitrogen ($N_2$) and water ($H_2O$) by a reagent comprising ammonia ($NH_3$), urea [$(NH_2)CO(NH_2)$], or the like. In this part of the process, the effluent containing $NO_x$ and some $SO_2$ is passed over a $NO_x$ reducing catalyst which is effective to reduce the $NO_x$ in the presence of these reagents. It also strongly promotes the oxidation of $SO_2$ to $SO_3$. It is an advantage of the invention that $NO_x$ can be controlled and the $SO_3$ burden created by an SCR unit or other $SO_2$ oxidizing source or equipment is also controlled.

In a typical operation, the $NO_x$-reducing reagent is urea or ammonia, stored for use as an aqueous solution, such as in tank 28. The urea solution can be at the concentration desired for use or it can be concentrated for dilution at the time of use. It can also be stored dry and hydrated to the desired degree on an as-needed basis. The nitrogenous treatment agent is preferably present in a ratio of the nitrogen in the treatment agent to the nitrogen oxides level between about 0.5 and about 3.5. Advantageously, the nitrogenous treatment agent is included in an amount of about 3% to about 35% by weight of the total composition, including diluent (i.e., water).

The solution can be fed to one or more injectors, such as nozzle 31. The nozzles can be of conventional design for spraying solutions and can be of the liquid-only or liquid and gas design. Where nozzles of the liquid and gas type are employed, internal mix nozzles are preferred to assure consistency of droplet size. Introduction of the urea under the preferred conditions results in production of ammonia and other species in addition to effecting $NO_x$ reduction in the area of introduction.

The $NO_x$ reducing agent containing effluent is most preferably passed over the SCR catalyst while the effluent is at a temperature at least 100° C. and below about 600° C., preferably at least 250° C. In this manner, the ammonia and other active gaseous species present in the combustion gases due to the introduction of the urea solution most effectively facilitates the catalytic reduction of nitrogen oxides. The effluent will preferably contain an excess of oxygen, e.g., from about 1 to about 10%. An additional layer or unit of catalyst is effective in reducing ammonia by reacting with $NO_x$ to provide $NO_x$ reduction and ammonia slip control. Where high solid loading is a concern, this typically requires additional catalyst due to increased pitch size.

Directly following the last catalyst section, there is typically a relatively short duct section 24 which guides the effluent to an air heater 23 and then out duct 34 to stack 36. In the short duct section 24 following the catalyst 32", a nozzle 40 or series of such nozzles is provided for introducing magnesium hydroxide slurry from vessel 42. An important feature of the invention is the discovery that if the particle size of the magnesium hydroxide in the slurry is carefully controlled to have a mean diameter of under 8 microns, preferably under 5 microns, e.g., from about 3 to 4.5 microns, the heat available in the effluent in duct 24, while low, will still be high enough to vaporize the water from the slurry and leave micro sized particles of active chemical to react with the $SO_3$ sufficiently to actually decrease the tendency of the $SO_3$ to form ammonium sulfate and bisulfate compositions, increase the pH of the effluent and decrease the tendency of the effluent to corrode the air heater or cause acid plume from the stack.

It is an advantage of the invention that the $SO_3$ and/or MgO reactants will be captured to some to an extent on the heat transfer surfaces of the air heater 23, which will then carry the captured reactant to increase the opportunity for gas to solid contact to occur. In other words, the capture of either of the two reactants on the heat transfer surfaces will increase the apparent rate of reaction by increasing gas/solid reactant contact. Any configuration of surface can be employed for the heat transfer surfaces of the air heater 23, but those characterized by heat transfer surfaces receptive to adherence of MgO, such as those available from Ljungstrom as recuperative air heaters, are believed especially effective. Any surface material can be employed for the heat transfer surfaces of the air heater 23, but those characterized by coated or uncoated steel, are believed especially effective. The temperature of the surfaces is believed to be optimally maintained within the range of from about 150 to about 350° C.

The magnesium hydroxide reagent is preferably prepared from brines containing calcium and other salts, usually from underground brine pools or seawater. Dolomitic lime is mixed with these brines to form calcium chloride solution and magnesium hydroxide which is precipitated and filtered out of the solution. This form of magnesium hydroxide can be mixed with water, with or without stabilizers, to concentrations suitable for storage and handling, e.g., from 25 to 65% solids by weight. For use in the process, it is diluted as determined by computational fluid dynamics (CFD) to within the range of from 0.1 to 10%, more narrowly from 1 to 5%. When it contacts the effluent in the small space between the catalyst and the air heater, it is reduced to nano-sized particles, e.g., under 200 nanometers and preferably below about 100 nanometers. Median particle sizes of from 50 to about 150 nanometers are useful ranges for the process of the invention. Other forms of MgO can also be employed where necessary or desired, e.g., "light burn" or "caustic" can be employed where it is available in the desired particle size range.

In another alternate form, suitable chemicals can be substituted for the magnesium oxide/hydroxide described in detail above. Generically, they should be capable of spraying in fine droplet form, drying to an active powder within the available duct work and reacting with the $SO_2$ and/or $SO_3$ in the effluent. Among the suitable alternative chemicals are oxides or hydroxides of calcium, potassium, sodium, and/or other alkali and alkali earth metals.

To best achieve these effects, the invention will preferably take advantage of CFD to project flow rates and select reagent introduction rates, reagent introduction location(s), reagent concentration, reagent droplet size and reagent momentum. CFD is a well understood science, but is not always utilized when it can be of benefit, such as in this case, where space limitations are so extreme. It is essential to obtain the correct concentrations, rates and introduction rates for the proper form of magnesium hydroxide to enable chemical reductant to be added with effect and without fouling in the short (e.g., often under 25 feet, and 10 to 20 feet in cases) duct 24 following an SCR unit. The implementation of CFD to the invention can be accomplished as set out in U.S. patent application Ser. No. 10/754,072. Particulate removal equipment (not shown) can be employed to remove particulates prior to passing the effluent up the stack.

In another aspect, the invention provides a process for reducing $SO_3$ emissions from combustion of a sulfur containing carbonaceous fuel in the combustion zone of a combustor wherein downstream conditions or equipment other than an SCR catalyst can cause the oxidation of $SO_2$ to $SO_3$. Here, the sulfur containing carbonaceous fuel is combusted with an overall excess of oxygen to form combustion gases comprising $SO_2$ and is moved though heat exchange equipment under conditions which cause the oxidation of $SO_2$ to $SO_3$; and prior to contact with an air heater for heating incoming combustion air, introducing magnesium hydroxide in amounts and with droplet sizes and concentrations effective to form nano-sized particles in the effluent and reduce $SO_3$ caused by the oxidation of $SO_2$. Here, the schematic of FIG. 1 is equally applicable, but the catalyst 32 is optional.

In another alternate form of the invention, combustion catalysts and or effluent treatment chemicals can be added to the fuel, combustion zone or otherwise as described, for example in U.S. patent application Ser. No. 10/754,072, filed Jan. 8, 2004. In one exemplary situation a suitable reagent such as magnesium hydroxide is introduced from vessel 50 through line 52 and nozzle 54. The entire disclosure of the above-noted U.S. patent application Ser. No. 10/754,072 is incorporated herein by reference.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A process for reducing $NO_x$ and $SO_3$ emissions from combustion of a sulfur containing carbonaceous fuel in the combustion zone of a combustor, comprising:

combusting a sulfur containing carbonaceous fuel with an overall excess of oxygen to form combustion gases comprising $NO_x$, $SO_2$, and $SO_3$;

introducing a nitrogen containing $NO_x$ control agent into the combustion gases at a point upstream of a selective catalytic reduction catalyst for reduction of $NO_x$; and following the catalyst and prior to contact with an air heater for heating incoming combustion air, introducing magnesium hydroxide in amounts and with droplet sizes and concentrations effective to form nano-sized particles in the effluent and reduce $SO_3$ caused by the oxidation of $SO_2$.

2. A process according to claim 1, wherein computational fluid dynamics is employed to determine flow rates and select reagent introduction rates, reagent introduction location(s), reagent concentration, reagent droplet size and/or reagent momentum.

3. A process according to claim 1, wherein a combustion catalyst and/or an effluent treatment agent is introduced into the combustion zone of the combustor.

4. A process according to claim 3, wherein computational fluid dynamics is employed to determine flow rates and select reagent introduction rates, reagent introduction location(s), reagent concentration, reagent droplet size and/or reagent momentum.

5. A process according to claim 1, wherein the magnesium hydroxide is diluted as determined by computational fluid dynamics to within the range of from 0.1 to 20%.

6. A process according to claim 5, wherein the magnesium hydroxide is diluted as determined by computational fluid dynamics to within the range of from 1 to 10%.

7. A process according to claim 5, wherein the effluent in the space between the catalyst and the air heater contacts the magnesium hydroxide slurry and reduces it to nano-sized particles of under 200 nanometers.

* * * * *